(12) United States Patent
Deckert

(10) Patent No.: US 6,408,586 B1
(45) Date of Patent: Jun. 25, 2002

(54) PERFORATED SHEET FLOORPLATE ELEMENT

(75) Inventor: Serge Deckert, Mundolsheim (FR)

(73) Assignee: Lohr Industrie, Hangenbieten (FR)

( * ) Notice: Subject to any disclaimer, the term of this patent is extended or adjusted under 35 U.S.C. 154(b) by 0 days.

(21) Appl. No.: 08/335,692

(22) PCT Filed: May 13, 1993

(86) PCT No.: PCT/FR93/00462

§ 371 (c)(1),
(2), (4) Date: Aug. 30, 1999

(87) PCT Pub. No.: WO93/23279

PCT Pub. Date: Nov. 25, 1993

(30) Foreign Application Priority Data

May 15, 1992 (FR) .............................................. 92 06096

(51) Int. Cl.$^7$ ................................................. E04C 2/38
(52) U.S. Cl. ..................... 52/630; 52/220.4; 52/745.19; 52/783.11; 72/379.6; 29/897.2
(58) Field of Search ................................ 52/630, 220.2, 52/220.4, 450, 745.19, 336, 783.11; 72/379.2, 379.6; 29/897.2

(56) References Cited

U.S. PATENT DOCUMENTS

| 2,692,032 A | | 10/1954 | Peterson |
| 3,421,279 A | | 1/1969 | Franc |
| 3,856,344 A | | 12/1974 | Loeber |
| 4,527,372 A | * | 7/1985 | Ryan ........................... 52/334 |
| 4,962,622 A | | 10/1990 | Albrecht et al. |

FOREIGN PATENT DOCUMENTS

FR 2130084 11/1972

* cited by examiner

Primary Examiner—Beth A. Stephan
Assistant Examiner—Naoko Slack
(74) Attorney, Agent, or Firm—Davis & Bujold, P.L.L.C.

(57) ABSTRACT

A floorplate element formed from a perforated sheet metal in which the floorplate element has a sequence of raised areas and recessed grooves. The floorplate element has at least one thinner transverse recessed area which results from a compression-pinching of the perforated sheet metal of a bottom surface of the grooves towards an top surface of the raised areas. Each transverse recessed area forms a surface for supporting the floorplate element on a crossbeam of a supporting structure. The invention is suitable for use in commercial vehicles as a loading surface.

20 Claims, 4 Drawing Sheets

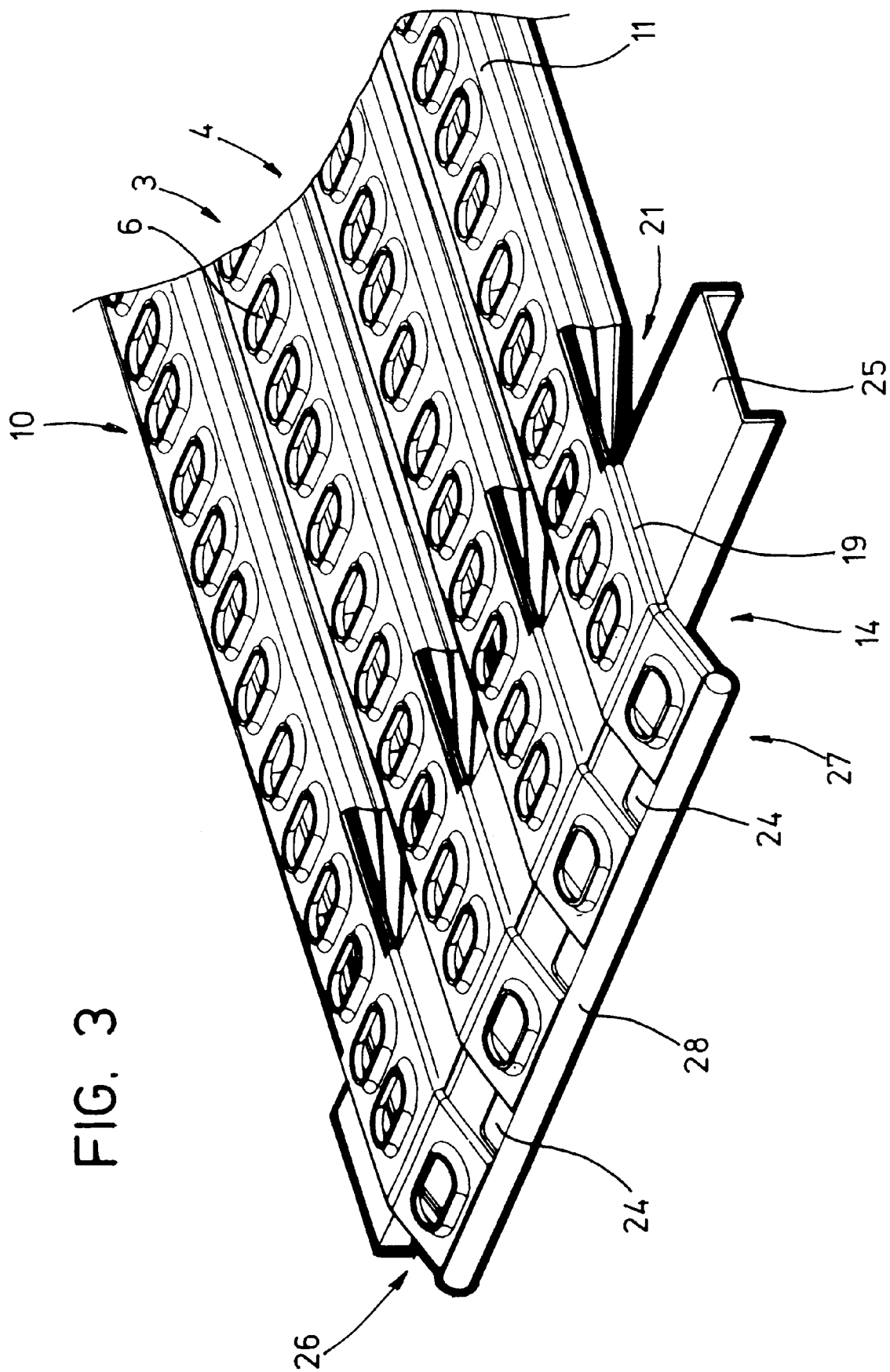

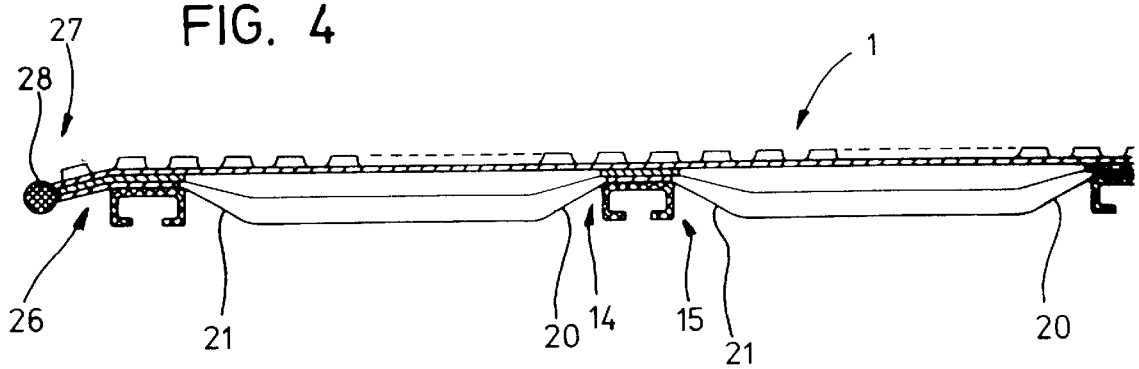
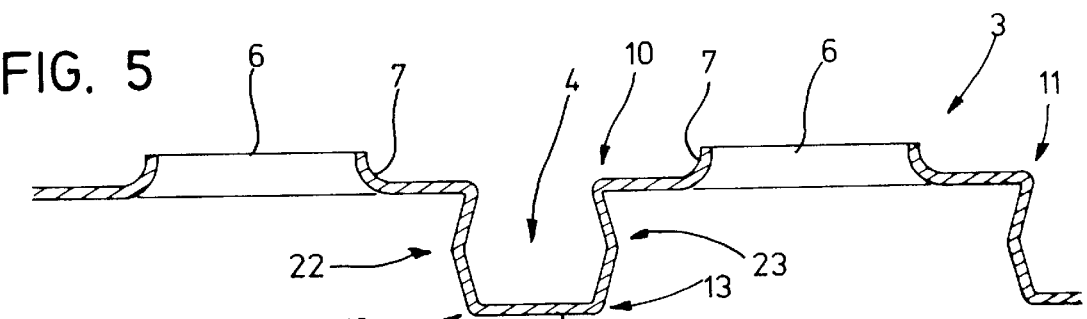
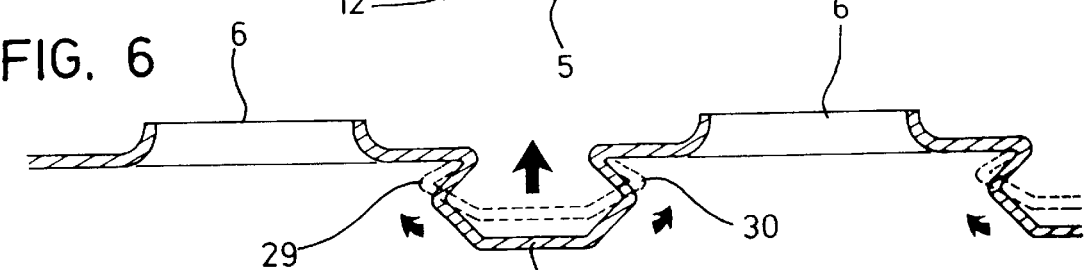
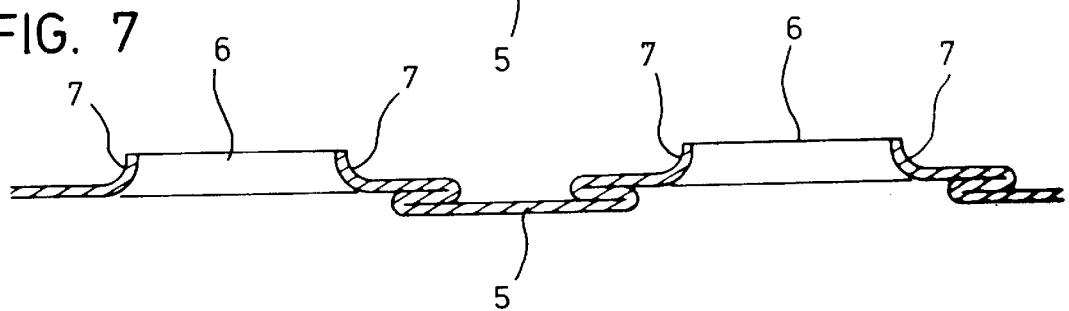

PERFORATED SHEET FLOORPLATE ELEMENT

FIELD OF THE INVENTION

The present invention relates to a floorplate element for use as a bearing surface for a deck or platform of a commercial vehicle.

One of the applications envisaged relates to car-transporter vehicles.

This element is manufactured in large format with a view to being able to cut it to the precise dimensions of the frame structures which carry the floorplate.

PRIOR ART

At present, to cover the supporting framework of a vehicle loading deck, there are used perforated sheet plates resting on the rigidifying structure of a base frame.

This base frame comprises crossbeams firmly connected with longitudinal beams on which are mounted the perforated sheet plates.

Since the vehicle-transporting decks thus formed are mechanically stressed during transportation, it is advisable to immobilize sufficiently the supporting structures and their covering plates.

Thus, both the elements of the rigidifying structures of the supporting surface and the perforated plates are welded at numerous points.

These mechanical stresses entail the multiplication of weld seams necessary in places frequently of difficult access.

Exposure of these decks to bad weather imposes closure of the gaps at the junctions by an impervious material.

These structural requirements entail difficulties and excessive manufacturing costs.

Moreover, the crossbeams used consist of shaped members of partially or totally closed section defining cavities accessible only with difficulty to anti-rust protection products, paint and maintenance and cleaning products, even if the later are atomized under pressure.

Through a lack of protection and maintenance, these structures undergo premature ageing caused mainly by bad weather and the difficulty of providing effective protection.

Moreover, the interior volume of these shaped members of partially closed section escapes inspection.

Owing to the considerable differences between the tread widths of various vehicles to be transported, it is advisable to provide these perforated sheet plates over sizeable widths, sometimes necessitating two sheet formats.

OBJECTS OF THE INVENTION

The floorplate element according to the invention aims to remedy these principal disadvantages by the possibility of manufacturing rapidly and simply very long floorplates which are longitudinally self-locked by direct flush-fitting on the crossbeams of the supporting framework.

To this end, the floorplate element is characterized in that:

- it is self-supporting between two successive transverse supports;
- it may be mounted by a light fixing device complementing its detachable longitudinal self-locking;
- it is economical and conformed to industrial mass production;
- its shapes make it very easy to paint and to apply a protective layer;
- inspection and cleaning prove considerably easier since its volumes are visible and open;
- the grooves form cavities which may aid storage or the construction of a floor by engaging therein beams of small section;
- it is possible to protect the surface of the floorplate by any suitable treatment before mounting it on its support;
- the absence of weld seams permits mounting of different metals between the supporting structure and the floorplate, for example aluminium on iron.

SUMMARY OF THE INVENTION

The invention proceeds from the general inventive idea which consists in constructing a floorplate element of sheet folded according to a profile exhibiting a transverse sequence of raised areas and grooves, in forming by fold-compression of the sheet transverse planar recessed areas without modifying the raised areas which may be perforated, and in using these transverse planar recessed areas as bearing surfaces on the crossbeams of a supporting structure.

It relates more particularly to a floorplate element for use as a load bearing surface for a commercial vehicle, and is characterized in that its body is a corrugation of sheet folded in a transverse sequence of planar raised areas and grooves, said corrugation being formed from a sheet format by parallel longitudinal bends and exhibiting transverse recessed areas resulting from controlled localized compression of the lateral walls with a bringing closer of the bottoms of the grooves to the upper surface, the recessed areas being used as bearing surfaces for the floorplate element on the crossbeams of a supporting structure, in that controlled localized compression is effected without deformation of the raised areas, and in that the controlled localized compression extends over transverse areas.

BRIEF DESCRIPTION OF THE DRAWINGS

The technical characteristics and other advantages of the invention are recorded in the following description, made by way of non-limiting example, of one embodiment with reference to the accompanying drawings, in which:

FIG. 3 is a perspective view of an example of a front end formed as a front spoiler;

FIG. 4 is a view in longitudinal section of the floorplate element along an upper fold line;

FIGS. 5, 6 and 7 are cross-sectional views respectively of a groove before, during and after pinch-compression in the transverse recessed area.

DETAILED DESCRIPTION OF THE EMBODIMENTS ILLUSTRATED

Figure 1:
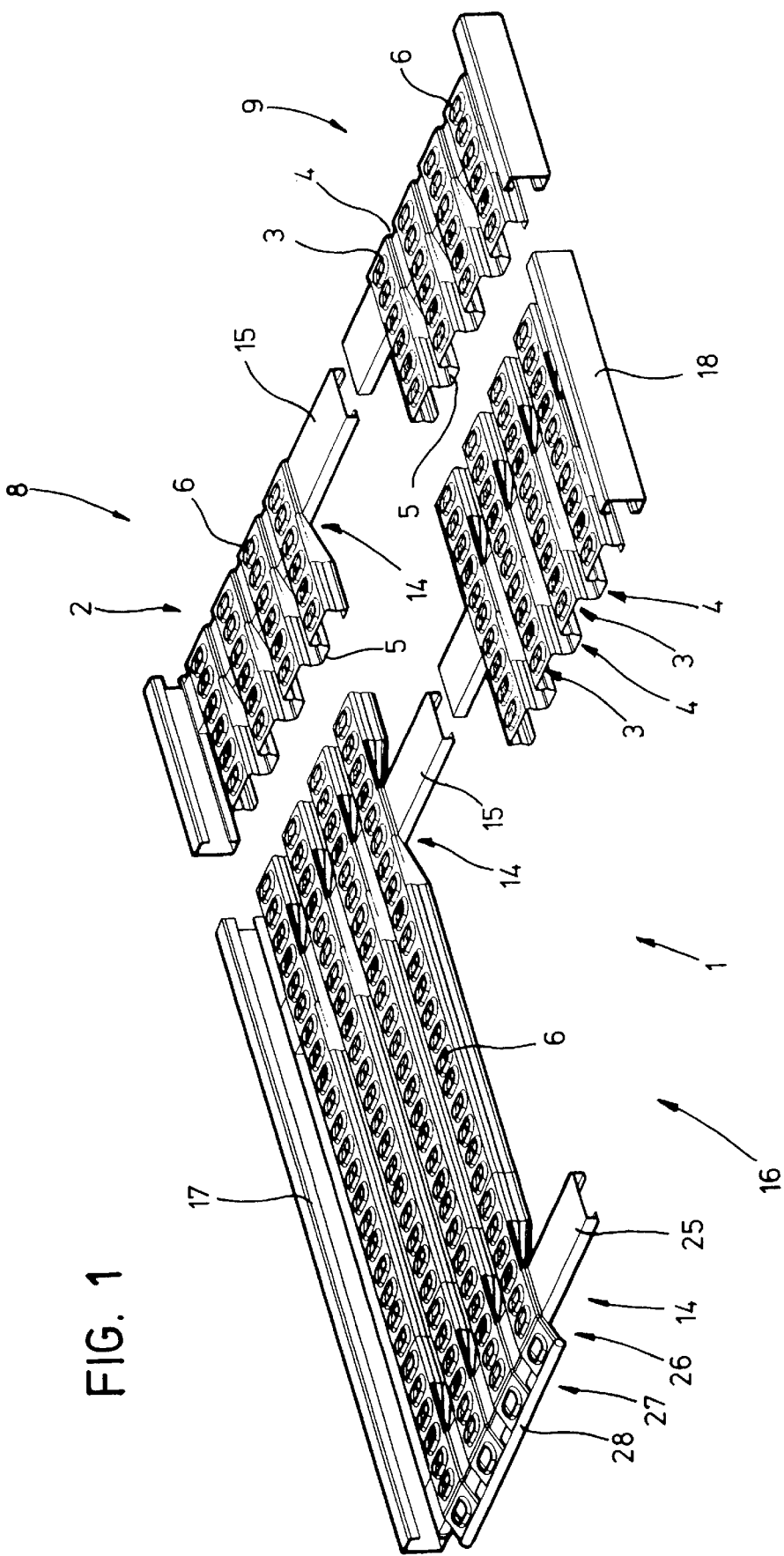
FIG. 1 is a general, fragmentary view showing in perspective a deck equipped with two floorplate elements according to the invention on each running track.

The current floorplate element 1 forming the subject matter of the present invention is formed from a sheet format previously folded into transverse corrugations 2 in the form of a sequence of crenellations alternately exhibiting a, preferably planar, raised area 3, and a longitudinal groove 4 with, for example, a flat bottom 5.

The format sheet is then perforated by embossing or cutting along longitudinal lines of perforations 6 along the median part of each raised area 3.

The edges such as 7 of the perforations 6 are either raised to form an anti-skid surface in the case of a vehicle-transporting body or oriented downwards, that is to say inwardly, in the case of a smooth surface required for freight transport.

This corrugated formation with planar raised areas 3 and grooves 4 with flat bottoms ensures adequate rigidification of the structure for the application envisaged.

The raised areas 3 comprising perforations constitute as many elementary running surfaces separated by the longitudinal grooves 4.

As shown in FIG. 1, a floorplate element is formed of several juxtaposed elementary running surfaces together constituting a right-hand running strip 8 and a left-hand running strip 9 for the running tracks of a vehicle in the case of vehicle transportation.

The general profile of the preferred embodiment of the floorplate element according to the invention has a generally crenellated form consisting of a sequence of main walls which define between them rigidifying bends.

It is thus possible to distinguish between upper rigidifying bends such as 10 and 11 bordering the raised areas 3 and lower ridigifying bends such as 12 and 13 bordering the flat bottom 5 of the grooves 4.

According to one of the essential characteristics of the invention, the floorplate element has at (or not at) regular intervals transverse recessed areas such as 14 extending over the whole width of the element.

These transverse recessed areas serve as bearing surfaces for the floorplate, by means of which it rests on crossbeams such as 15 of a supporting structure 16, for example a vehicle supporting deck as shown in FIG. 1.

This frame-mounted deck is defined longitudinally by right-hand 17 and left-hand 18 longitudinal edge beams along the right-hand 8 and left-hand 9 running strips.

The transverse recessed areas have a planar central part 19 equal or close in length to the upper part of the corresponding crossbeam; they are defined on each side of the central part 19 by the transverse sequence of a left-hand incline such as 20 and a right-hand incline such as 21 for each of the grooves and raised areas over a single transverse recessed area 14. For reasons of drawing clarity, one of the inclines is shown cut-away with straight breaks (graphic rib effect).

The transverse recessed areas 14 are obtained by fold-compression of the material over transverse strips marking the recessed areas.

The compression is effected by bringing the lower face closer to the upper face without deformation of the optionally perforated raised areas 3.

Figure 2:
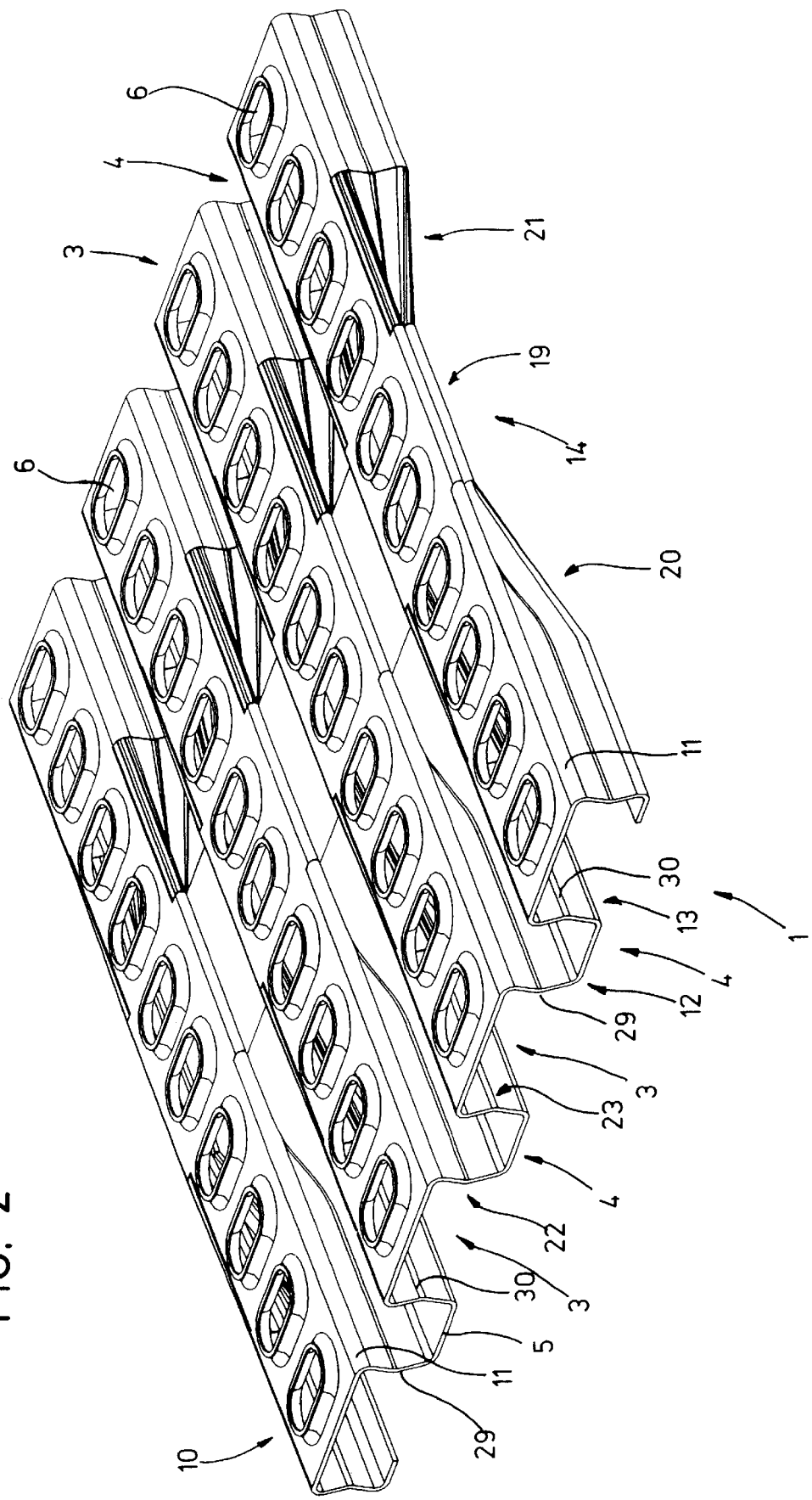
FIG. 2 is a perspective view of a piece of floorplate in the area of a transverse recessed area.

To do this, each of the left-hand 22 and right-hand 23 lateral walls of the grooves or groove sides (in FIGS. 2 and 5) has to be so shaped, by means of bends or any other means, as to show an ability or predisposition for buckling-compression or to be assisted or forced into this type of buckling by external means; bearing abutment surfaces, tool members, jaws or the like.

The compression is effected by mechanical closing stress on a well defined zone corresponding to a transverse strip, maintaining a sufficiently extensive raised area surface situated opposite without deformation thereof.

During this operation, the sheet folds and becomes flattened in the recessed areas 14 against the under-surface of the corresponding raised area 3 according to a totally planar formation defining a recessed face corresponding to the localized rise of the bottom 5 of each groove limited by the thickness of the lateral walls 22 and 23 flattened by compression against the edges of each raised area.

One of the objects of the invention is to keep the perforations completely free so as to permit easy evacuation of water and dirt but also above all to permit positioning of the hooks of stowage straps or other accessories immobilized in the perforations.

To do this, the height of the lateral walls 22 and 23 and the positioning of the fold lines are selected appropriately to prevent the edge formed by folding-compression of the sheet from occupying the opening or even the edge of each perforation 6.

In order to evacuate the water which may accumulate in the grooves, openings similar to those such as 24 visible at the front end are provided in the groove bottom at the lowest level between the two recessed areas.

Each floorplate element 1 ends at the front in a recessed area to permit its frontal support on a front end crossbeam 25. The floorplate element continues with a sloping end 26 so as to form a front access spoiler 27 ending in an aesthetically pleasing edging for resting on the ground, for example in the form of a transverse circular bar 28.

This, owing to the circular shape of its section, may be used at the same time as an axis of articulation with an adjoining supporting deck or act as a ramp start in the case of several successive decks separated by an access board.

Articulation engagement is effected at each of the ends of the front end ramp or spoiler 27 or at different points over its length at the site of some or all of the water evacuation openings 24 at the front end 26.

This front spoiler permits the loading of vehicles from the ground, without violent displacement which is a source of loading difficulties and of deterioration of the vehicles.

As indicated above, the floorplate has to be able to be used for freight transport vehicles. In this case, a smooth floor has to be constructed on which the parcels, cases, containers and the like may slide. To this end, the spaces defined by the grooves are filled with the aid of rectilinear members of another material, wood, plastics material, suitably formed to occupy all the space available in the grooves and to become flush with the upper surface of the raised areas 3.

Several means intended to permit buckling of the lateral walls or groove sides will be described below in non-limiting manner.

First of all, there may be intermediate longitudinal folding-compression lines such as 29 and 30 formed along each of the lateral walls at a suitable height corresponding to the aim sought of not blocking the perforation openings.

These bends correspond to deformation of the plane of the lateral wall into two abutting inclined planes and give the section of the walls of the grooves a profile in broken lines.

According to the preferred variant, this characteristic is expressed by a groove section in broken lines, for example a groove section of hexagonal type in the form of two attached, opposing trapezoids.

An optimum embodiment of the preferred variant uses a shape of two, for example equal, isoceles trapezoids.

It is also possible to envisage section shapes for the lateral surfaces 22 and 23 which are concavely or convexly rounded.

Various other means producing the same effects and same results have proven possible.

It is also possible to suggest on each of the lateral walls a longitudinal area treated in such a way as to exhibit lower mechanical strength.

It is also possible to suggest a continuous support surface along the grooves or local to the site of the deformation.

This support surface may consist of any surface, for example a counter-piece, the jaws of a tool of the spreader or pliers type, or the rounded lateral surface of a rectilinear member placed in the groove, which is rigid or deformable between a rest state and a state of bearing-abutment contact.

The present invention also relates to the process of manufacturing the floorplate element.

According to the basic variant of this process, a corrugation of generally crenellated profile is effected by continuous successive folding in a length of sheet, in a sequence of raised areas and grooves; at the same time each of the lateral sheet walls is shaped into a form capable of deformation; the sheet is perforated along the raised areas by a linear sequence of perforations; the floorplate is compressed locally, at intervals, in transverse areas by closing of the lower walls towards the upper surface against an abutment keeping the upper surface in a fixed position; and the floorplate element is cut transversely to the desired length.

This compression may be effected easily by pinching owing to the ability and predisposition for deformation, for example by buckling, conferred by the shapes of the lateral walls of the grooves.

It is possible to envisage a tool which cuts to the desired length and compresses at the same time.

The process is characterized by the following different variants.

As above, a corrugation of generally crenellated profile is effected by continuous successive folding in a sheet format, in a sequence of raised areas and grooves; the sheet is perforated along the raised areas by a linear sequence of perforations, but maintaining each of the lateral walls of the grooves locally, over the area of perforations extending over the recessed area and each side thereof or all along the grooves, during the compression operation by constant or temporary supporting or thrusting contact with all suitable contact surface with a view to mechanical assistance of the buckling-compression.

The contact surface assisting the buckling is deformable to order between a rest state and a bearing-abutment contact state.

The bearing surface may be rounded, such as, for example, that of a tube of circular section placed in each groove. It is deformable if the tube envisaged is capable of dilating under the action of a compressed fluid.

According to another variant, the bearing surface is that of the working piece or against the piece of a tool which may be of the jaw type, for example a spreader or pliers.

Here too it is possible to provide a tool which cuts to the desired length and compresses at the same time.

It goes without saying that, beyond the means described, diverse obvious modifications and simple variants enter into the scope of the present invention.

What is claimed is:

1. A floorplate element for use as a load bearing surface for a vehicle, the floorplate element comprising a folded sheet which forms a corrugation (2) having a plurality of sequentially and longitudinally extending planar raised areas (3) and recessed grooves (4) spaced from one another by lateral walls (22, 23), and the corrugation (2) having a plurality of bends (10, 11, 12, 13);

wherein the corrugation (2) has at least one transverse recessed area (14) formed by a controlled localized compression of a portion of the grooves (4) and the lateral walls (22, 23) toward an upper surface of the raised areas (3), without deformation of the upper surface of the raised areas (3) in the at least one transverse recessed area (14), and the at least one transverse recessed area (14) extends transverse to a longitudinal direction of the floorplate element and forms a bearing surface for supporting the floorplate element by a crossbeam (15, 25) of a supporting structure (16).

2. The floorplate element according to claim 1, wherein the controlled localized compression forces a portion of the lateral walls (22, 23) of the grooves into abutting contact with a lower surface of the raised areas (3).

3. The floorplate element according to claim 1, wherein each one of the raised areas (3) has a plurality of perforations (6) formed therein.

4. The floorplate element according to claim 1, wherein a cross-sectional form of the corrugation (2) is substantially crenellated.

5. The floorplate element according to claim 4, wherein a portion of the lateral walls (22, 23) defining the grooves (4) are rounded.

6. The floorplate element according to claim 5, wherein the lateral walls (22, 23) are rounded concavely.

7. The floorplate element according to claim 5, wherein the lateral walls (22, 23) are rounded convexly.

8. The floorplate element according to claim 1, wherein each lateral wall comprises two surfaces which intersect with one another along an intermediate folding-compression line (29 or 30).

9. The floorplate element according to claim 1, wherein each one of the raised areas (3) has a plurality of perforations (6) formed therein and the plurality of perforations (6) are raised to form an anti-skid surface for the floorplate element.

10. The floorplate element according to claim 1, wherein each of the raised areas (3) has a plurality of perforations (6) formed therein and the plurality of perforations (6) are recessed to form a smooth surface for the floorplate element.

11. The floorplate element according to claim 1, wherein a longitudinal edge of the floorplate element has a longitudinal edge beam and a front area of the floorplate element slopes and has an access spoiler to facilitate loading of an object on the floorplate element.

12. The floorplate element according to claim 1, wherein each lateral wall comprises two surfaces which intersect with one another along an intermediate folding-compression line (29 or 30), each one of the raised areas (3) has a plurality of perforations (6) formed therein, and a height of the lateral walls (22, 23) and location of the intermediate folding-compression lines (29, 30) are such that folded edges of the folded walls, following the controlled localized compression, is spaced from the plurality of perforations (6) such that each of the plurality of perforations (6) remains unobstructed.

13. The floorplate element according to claim 1, wherein the grooves (4) accommodate a rectilinear member to provided a continuous planar loading surface.

14. A floorplate element for use as a load bearing surface for a vehicle, the floorplate element comprising a folded sheet which forms a corrugation (2) having a plurality of sequentially and longitudinally extending planar raised areas (3) and recessed grooves (4) spaced from one another by lateral walls (22, 23), and the corrugation (2) having a plurality of bends (10, 11, 12, 13);

wherein the corrugation (2) has a plurality of transverse recessed areas (14) with each of the transverse recessed areas (14) formed by a controlled localized compression of a portion of the grooves (4) and the lateral walls (22, 23) toward an upper surface of the raised areas (3), without deformation of the upper surface of the raised areas (3) in each of the plurality of transverse recessed areas (14), and each of the plurality of transverse recessed areas (14) extends transverse to a longitudinal direction of the floorplate element and forms a bearing surface for supporting the floorplate.

15. The floorplate element according to claim 14, wherein the spaced apart plurality of transverse recessed areas (14) are spaced from one another at regular intervals.

16. The floorplate element according to claim 14, wherein the spaced apart plurality of transverse recessed areas (14) are spaced from one another at irregular intervals.

17. The floorplate element according to claim 14, wherein each of the plurality of transverse recessed areas (14) are continuous and extend from one lateral edge to an opposite lateral edge of the floorplate element.

18. A process of manufacturing a support usable as a floorplate element or floor plate, the process comprising the steps of:

folding a sheet into a corrugation (2) having a plurality of sequentially and longitudinally extending planar raised areas (3) and recessed grooves (4) spaced from one another by lateral walls (22, 23), providing the corrugation (2) with a plurality of bends (10, 11, 12, 13);

forming a transverse recessed area (14) in the corrugation (2), at desired intervals, by a controlled localized compression by pinching a portion of the grooves (4) and the lateral walls (22, 23) toward an upper surface of the raised areas (3), without deformation of the upper surface of the raised areas (3) in each transverse recessed area (14), and each transverse recessed area (14) extending transverse to a longitudinal direction of the floorplate element to form a bearing surface for supporting the floorplate element by a crossbeam (15, 25) of a supporting structure (16).

19. The process according to claim 18, further comprising the step of predisposing the lateral walls (22, 23) of the grooves (4) to buckling and utilizing mechanical assistance to assist with buckling of the lateral walls (22, 23).

20. The process according to claim 19, further comprising the steps of:

perforating the raised areas (3) with a sequence of perforations (6), and cutting the corrugated sheet (2) is cut transversely to the desired length.

* * * * *